(12) United States Patent
Whytock et al.

(10) Patent No.: US 8,456,429 B2
(45) Date of Patent: Jun. 4, 2013

(54) ENCRYPTING TOUCH-SENSITIVE DISPLAY

(75) Inventors: Alexander W. Whytock, Perthshire (GB); David J. Sleeman, Dundee (GB); Colin A. Sinclair, Angus (GB)

(73) Assignee: NCR Corporation, Duluth, GA (US)

( * ) Notice: Subject to any disclaimer, the term of this patent is extended or adjusted under 35 U.S.C. 154(b) by 973 days.

(21) Appl. No.: 12/512,413

(22) Filed: Jul. 30, 2009

(65) Prior Publication Data
US 2011/0025610 A1 Feb. 3, 2011

(51) Int. Cl.
*G06F 3/041* (2006.01)
(52) U.S. Cl.
USPC ............ 345/173; 345/156; 345/157; 713/189
(58) Field of Classification Search
USPC .................. 345/156–158, 173–179; 713/189, 713/194
See application file for complete search history.

(56) References Cited

U.S. PATENT DOCUMENTS

| | | | |
|---|---|---|---|
| 5,768,386 A | 6/1998 | Yokomoto et al. | |
| 6,193,152 B1* | 2/2001 | Fernando et al. | 235/380 |
| 6,630,928 B1* | 10/2003 | McIntyre et al. | 345/173 |
| 2002/0095589 A1* | 7/2002 | Keech | 713/189 |
| 2003/0120936 A1* | 6/2003 | Farris et al. | 713/189 |
| 2006/0125797 A1* | 6/2006 | Whytock | 345/173 |
| 2007/0150749 A1* | 6/2007 | Monaghan et al. | 713/189 |

* cited by examiner

*Primary Examiner* — Kimnhung Nguyen
(74) *Attorney, Agent, or Firm* — Paul W. Martin

(57) ABSTRACT

A hardware encryption device comprises: a touch panel controller; and a cryptographic engine in communication with the touch panel controller. The touch panel controller receives co-ordinates from the cryptographic engine corresponding to an area on a touch panel selected by a user. The cryptographic engine is operable to discriminate between a selection in a secure area on a screen and a selection in a non-secure area on a screen, and to action the selection differently depending on whether the selection is in a secure area or a non-secure area.

8 Claims, 3 Drawing Sheets

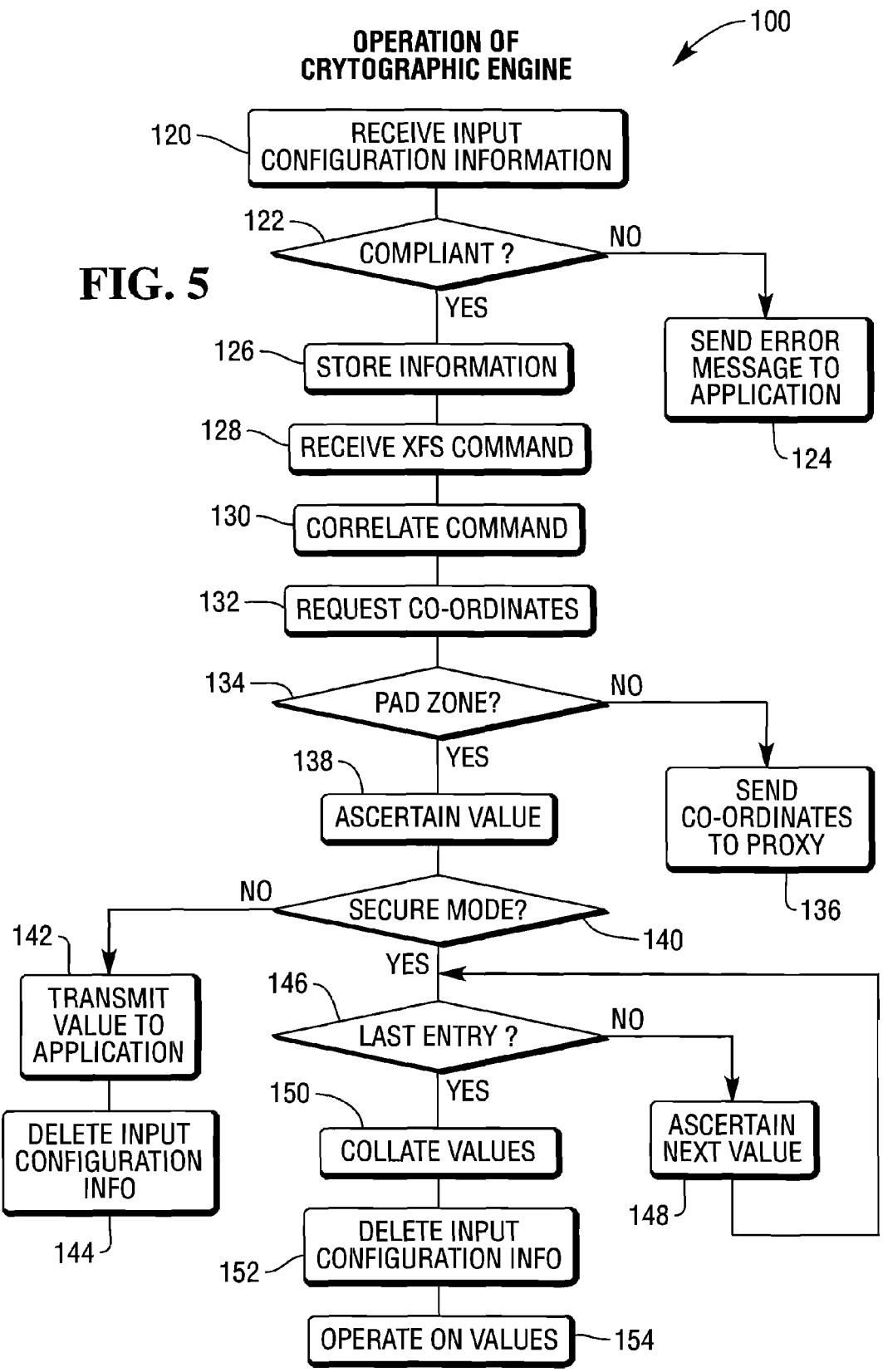

ENCRYPTING TOUCH-SENSITIVE DISPLAY

FIELD OF INVENTION

The present invention relates to a method and apparatus for controlling an encrypting touch-sensitive display. Encrypting touch-sensitive displays are useful for securing input of sensitive data at Self-Service Terminals (SSTs), such as automated teller machines (ATMs).

BACKGROUND OF INVENTION

SSTs are public access kiosks that are suitable for allowing a customer to conduct a transaction or to access information in an unassisted manner and/or in an unattended environment.

Common examples of SSTs include automated teller machines (ATMs), information kiosks, financial services centers, bill payment kiosks, lottery kiosks, postal services machines, check-in and check-out terminals such as those used in the hotel, car rental, and airline industries, retail self-checkout terminals, vending machines, and the like.

Some SSTs (such as ATMs, financial services centers, and the like) require customers to enter secure (or secret) data, such as a personal identification number (PIN). This is typically implemented using a secure hardware device referred to as an encrypting keypad, so that a customer's PIN never leaves the encrypting keypad as plaintext. However, these encrypting keypads are expensive and provided in addition to touch-sensitive displays. It would be preferable to provide a touch-sensitive display with encrypting functionality.

At least one type of encrypting touch-sensitive display has been proposed (U.S. Pat. No. 5,768,386). However, this has the disadvantage that every touch selection made by a customer is encrypted and then subsequently decrypted, even if the selection made by the customer does not relate to private or secure data.

It is among the objects of an embodiment of the present invention to overcome or mitigate the above problem or other problems associated with prior art touch-sensitive displays.

SUMMARY OF INVENTION

Accordingly, the invention generally provides methods, systems, apparatus, and software for encrypting touch-sensitive displays.

In addition to the Summary of Invention provided above and the subject matter disclosed below in the Detailed Description, the following paragraphs of this section are intended to provide further basis for alternative claim language for possible use during prosecution of this application, if required. If this application is granted, some aspects of the invention may relate to claims added during prosecution of this application, other aspects may relate to claims deleted during prosecution, other aspects may relate to subject matter never claimed. Furthermore, the various aspects detailed hereinafter are independent of each other, except where stated otherwise. Any claim corresponding to one aspect should not be construed as incorporating any element or feature of the other aspects unless explicitly stated in that claim.

According to a first aspect there is provided a method of controlling an encrypting touch-sensitive display, the method comprising:

creating a pad zone on a screen to be rendered on the touch-sensitive display;

creating touch areas within the pad zone, each touch area having a value;

assigning an operating mode to the touch areas within the pad zone, where the operating mode is either: (i) secure, for which the value associated with each touch area is not returned to an application on selection of that touch area; or (ii) open, for which the value associated with each touch area is returned to an application on selection of that touch area;

providing an option to create a mouse area outside a pad zone on a screen to be rendered on the touch-sensitive display, but only where the operating mode of the touch areas within the pad zone is the open mode; and enabling a touch selection within the mouse area to be transferred to an operating system input queue.

The term "screen" is used herein to denote the graphics, text, controls (such as menu options), and such like, that are presented on an SST display; the term "screen" as used herein does not refer to the hardware (that is, the display) that presents the graphics, text, controls, and such like. Typically, when a transaction is being performed at an SST, a series of screens are presented in succession on the SST display, the next screen displayed being dependent on a user entry or activity relating to the current screen. For example, a first screen may request a user to insert a card; once a card has been inserted a second screen may invite the user to enter his/her PIN; once the final digit of the PIN has been entered, a third screen may invite the user to select a transaction from a list of transactions; and so on. All of these screens may be rendered on the same display.

The method may be implemented by a transaction application responsible for creating the screen to be rendered on the touch-sensitive display.

The step of creating a pad zone on a screen to be rendered on the touch-sensitive display may be implemented by conveying co-ordinates of the pad zone from an application to an engine located within a hardware encryption device. The engine may enforce rules to implement this method. The engine may encrypt customer selections on touch areas while in secure mode and transfer a block of encrypted selections (such as a PIN block) in response to a request for the block from the transaction application.

The step of creating a pad zone on a screen may be implemented on each occasion that a customer input via a keypad or keyboard is required, that is, for each screen having a keypad or keyboard input. The engine located within the hardware encryption device may delete the conveyed pad zone co-ordinates received from the application once the screen on which the pad zone is rendered is no longer displayed (or once a final input on that screen is received by the hardware encryption device).

The step of creating a pad zone on a screen and creating touch areas within the pad zone may be implemented simultaneously using a new command in the format of a CEN XFS command, such as WFS_CMD_PIN_SET_TOUCH_KEYBOARD. CEN is the European Committee for Standardization, and XFS is the eXtensions for Financial Services standard. The current version of this CEN XFS standard is v.3.10.

Optionally, conventional XFS service provider commands (that is, currently existing XFS service provider commands) can be used to request the engine to convey PIN data (WFS_CMD_PIN_GET_PIN), cleartext data (WFS_CMD_PIN_GET_DATA), or secure key data (WFS_CMD_PIN_SECUREKEY_ENTRY). Cleartext data can be used for conveying non-personal information, such as a transaction selection (for example, cash withdrawal, or print receipt).

Optionally, any touch areas defined (for example, by co-ordinates transmitted from the transaction application in a setup command, such as WFS_CMD_PIN_SET_TOUCH_KEYBOARD) but not activated by a conventional XFS service provider command (such as WFS_CMD_PIN_GET_DATA), are deactivated so that they do not respond to a customer selection.

Areas within the pad zone not corresponding to a touch area are preferably configured not to respond to a touch so that by default a pad zone only responds to touches at defined touch areas. A customer touch outside these defined touch areas, but inside the pad zone, will produce no response.

By virtue of this aspect, an encrypting touch-sensitive display is provided that can operate in a secure mode (such as XFS secure mode for PIN entry) or in an open mode (such as XFS open mode for entry of other data), or in a standard personal computer mode in which a customer selection can be treated as a mouse click and routed through an operating system. This enables an encrypting touch-sensitive display to be provided that complies with XFS rules, but also enables conventional operating system input methods (such as a mouse click) to be used. This also enables a secure keypad screen to be provided as a pane overlying another screen, for example, from another application.

According to a second aspect there is provided an encrypting touch-sensitive display control system, the system comprising:

a hardware encryption device including a cryptographic engine, the hardware encryption device being operable to (i) receive co-ordinates from a touch-sensitive display controller; (ii) identify a touch area within a pad zone created by an application corresponding to the received co-ordinates; (iii) in the event that the operating mode for that pad zone is open mode, to transmit a value associated with the identified touch area to an application; (iv) in the event that the operating mode for that pad zone is secure mode, to collate a plurality of successive identified touches, encrypt values associated with the plurality of successive identified touches to create an encrypted block, and to transmit the encrypted block to the application;

a driver suite for requesting the hardware encryption device to perform functions and route responses to a requesting application; and a keypad service provider for receiving standard commands and translating these commands for the driver suite to implement.

The driver suite may include one or more software objects for implementing status reporting, self-test, configuration, and maintenance of the hardware encryption device.

The driver suite may include one or more software objects for updating firmware in the hardware encryption device.

The driver suite may include one or more software objects for routing a touch selection within a mouse area on a screen to an operating system input queue.

The keypad service provider may implement a CEN XFS interface.

Alternatively, the hardware encryption device may be operable to (iv) in the event that the operating mode for that pad zone is secure mode, to collate a plurality of successive identified touches, create an encryption key (such as a PIN key) from the collated touches, and store the encryption key in a secure memory within the hardware encryption device. Whether the hardware encryption device stores an encryption key or transmits a PIN block depends on the screen used to prompt the user (a customer or an authorized person) to enter the data, and the service provider command associated with that screen.

According to a third aspect there is provided a method of operating an encryption engine for controlling an encrypting touch-sensitive display, the method comprising:

(i) receiving co-ordinates from a touch-sensitive display controller;

(ii) identifying a touch area within a pad zone created by an application corresponding to the received co-ordinates;

(iii) in the event that the operating mode for that pad zone is open mode, transmitting a value associated with the identified touch area;

(iv) in the event that the operating mode for that pad zone is secure mode, collating a plurality of successive identified touches.

In the event that the operating mode for that pad zone is secure mode, the method may further comprise encrypting values associated with the plurality of successive identified touches to create an encrypted block, and transmitting the encrypted block to the application.

Alternatively, in the event that the operating mode for that pad zone is secure mode, the method may further comprise updating an encryption key located within the encryption engine using the collated plurality of successive identified touches.

The method may further comprise: ascertaining if the received co-ordinates correspond to a touch selection within a mouse area (outside a pad zone); and transferring any touch selection within the mouse area to an operating system input queue.

According to a fourth aspect there is provided an integral, encrypting touch-sensitive display system comprising:

a display for rendering a screen created by an application;

a transparent, touch-sensitive panel in registration with the display and mounted thereto;

a touch-sensitive panel controller in communication with the touch-sensitive panel and operable to receive co-ordinates therefrom, the received co-ordinates corresponding to an area of the touch-sensitive panel touched by a customer;

a cryptographic engine in communication with the touch-sensitive panel controller and operable to discriminate between selection of a touch area within a pad zone in open mode and in secure mode; and a tamper-responsive mechanism sealingly enclosing the display, touch-sensitive panel, touch-sensitive panel controller, and cryptographic engine, to (i) detect disassembly or tampering of the coupled components, and (ii) reset the cryptographic engine in response thereto.

Tamper-responsive mechanisms are well-known to those of skill in the art and include micro-switches to detect disassembly, electrical grids to detect penetration of a component, membranes to detect penetration of a component, sensors to detect tempest attacks, grinding/slicing attacks, and the like.

According to a fifth aspect there is provided a self-service terminal (SST) incorporating the encrypting touch-sensitive display control system of the second aspect.

The self-service terminal may be an automated teller machine (ATM), an information kiosk, a financial services center, a bill payment kiosk, a lottery kiosk, a postal services machine, a check-in and/or check-out terminal such as those used in the retail, hotel, car rental, gaming, healthcare, and airline industries, or the like.

According to a sixth aspect there is provided a hardware encryption device comprising: a touch panel controller; and a cryptographic engine in communication with the touch panel controller to receive co-ordinates therefrom corresponding to an area on a touch panel selected by a user; wherein the cryptographic engine is operable to discriminate between a selection in a secure area and a selection in a non-secure area, and to action the selection differently depending on whether the selection is in a secure area or a non-secure area.

The cryptographic engine may include configuration information relating to the locations of any secure areas and any non-secure areas, and any selectable locations within these areas.

The cryptographic engine may allow a new encryption key to be entered by a user selecting numerals presented on a screen in a secure area.

The cryptographic engine may allow a customer PIN to be entered by a customer selecting numerals presented on a screen in a secure area.

These and other aspects will be apparent from the following specific description, given by way of example, with reference to the accompanying drawings.

BRIEF DESCRIPTION OF THE DRAWINGS

FIG. 5 is a flowchart illustrating steps implemented by a part (the cryptographic engine) of the encrypting touch-sensitive display sub-system of FIG. 1 in processing a customer selection.

DETAILED DESCRIPTION

Figure 1:
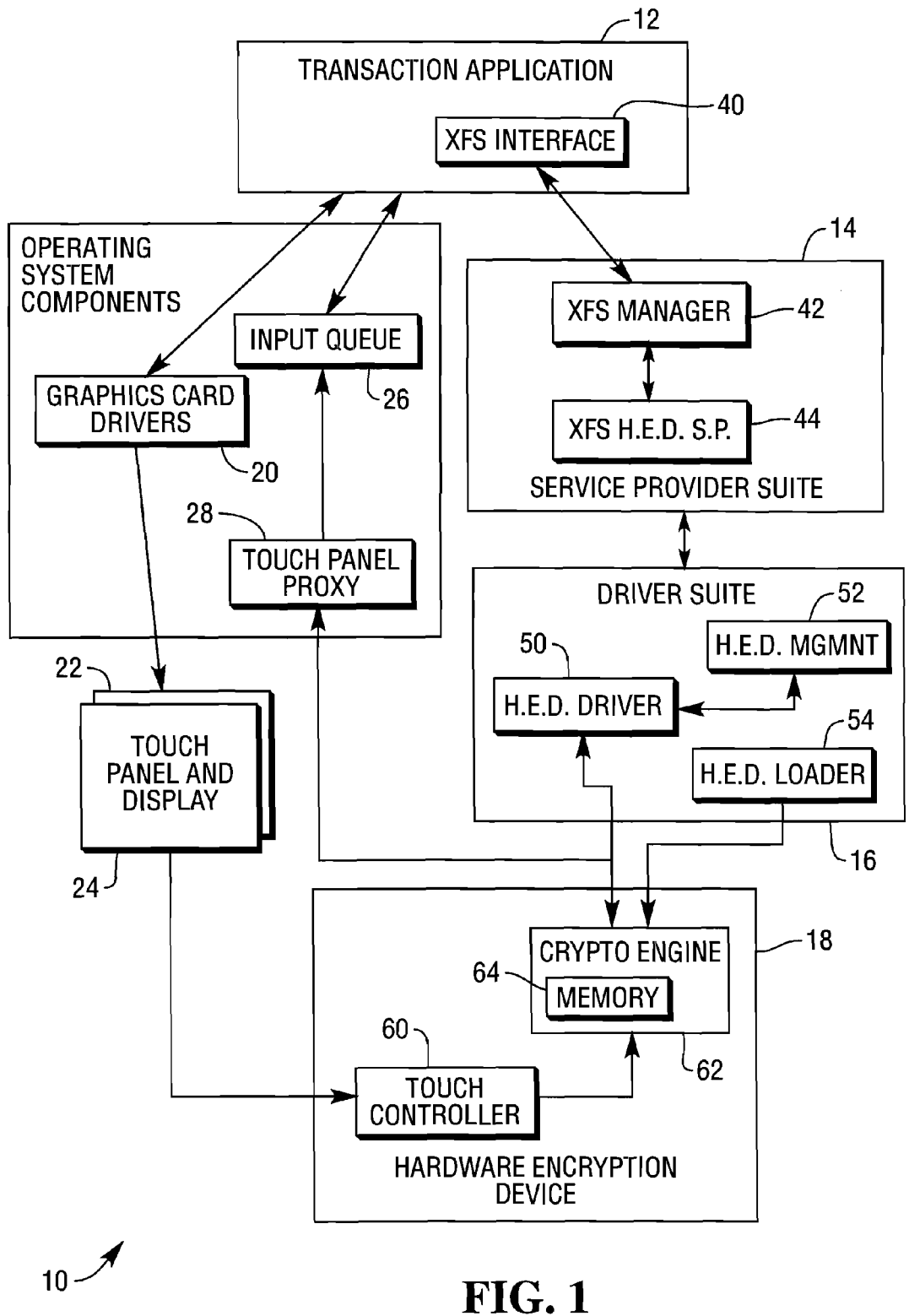
FIG. 1 is a simplified component diagram of an encrypting touch-sensitive display sub-system for an ATM, according to one embodiment of the present invention.

Reference will now be made to FIG. 1, which is a simplified component diagram of an encrypting touch-sensitive display sub-system 10 according to one embodiment of the present invention. The display sub-system 10 is implemented in an ATM (not shown). The diagram shows primarily the software components of the sub-system 10.

A transaction application 12 is provided for controlling the operation of the ATM. The transaction application is in communication with a service provider suite 14, which is coupled to a keypad driver suite 16. The keypad driver suite 16 sends proprietary commands to, and receives responses from, a hardware encryption device 18.

The transaction application 12 also communicates with graphics adapter drivers 20 that render screens on a display 22, on which is mounted a touch-sensitive panel 24.

An input queue operating system component 26 communicates with a touch panel proxy 28. The touch panel proxy 28 routes mouse click events from the hardware encryption device 18 to the input queue 26, which forwards the mouse click events to the transaction application 12.

These components will now be described in more detail.

The transaction application 12 implements transaction processing functions for customers, and device management functions for service personnel (such as engineers and replenishers). Transaction processing functions include a sequence of screens displayed to the customer, and associated commands for controlling the devices (for example, a cash dispenser, a card reader, the display 22) in response to customer inputs. Device management functions include state of health information and device test routines. The transaction application 12 also comprises a conventional CEN XFS interface 40 which is used for communicating with the service provider suite 14.

The service provider suite 14 comprises an XFS manager 42 that routes XFS commands to the appropriate XFS service provider for a particular device. In FIG. 1, only the hardware encryption device (HED) service provider 44 is illustrated, although other service providers would be present (for example, for a cash dispenser, a card reader, a receipt printer, and the like).

The driver suite 16 comprises a hardware encryption device driver 50, a management component 52 for monitoring the state of health of the hardware encryption device 18, and a component loader 54 for securely updating components in the hardware encryption device 18.

The hardware encryption device 18 comprises a touch panel controller 60 coupled to a cryptographic engine 62. The touch panel controller 60 is also coupled to the touch panel 24, and receives co-ordinates therefrom indicative of a point on the touch panel 24 being touched by a customer or other user. The touch panel controller 60 also includes functions to perform calibration of the touch panel, to debounce multiple touches, and to correct for drift and other inaccuracies, as is well known in the art.

The cryptographic engine 62 includes a secure memory 64 storing key loading keys and PIN encrypting keys. These keys are used in a conventional manner.

The cryptographic engine 62 receives proprietary commands from the HED driver 50 relating to portions of a screen about to be displayed and operating modes within those screen portions. The HED driver 50 ensures that these commands comply with rules relating to which operating modes can be used in various circumstances, and also correlates co-ordinates received from the touch panel controller 60 with corresponding values presented on the display 22, as will be described in more detail below.

Screen Configurations

Different screen configuration options will now be described with reference to FIGS. 2 to 4, which are pictorial representations of three screen layouts that can be rendered on the display 22.

A screen layout comprises one or more of two different types of zone.

The first type of zone is a pad zone. A pad zone can operate in one of two modes: XFS open mode, and XFS secure mode. In XFS open mode, when a customer selects a defined touch area within the pad zone then a value corresponding to that touch area is returned to the transaction application 12, typically in plain text (cleartext). In contrast, in XFS secure mode, when a customer selects a defined touch area within the pad zone then the hardware encryption device 18 waits until a correct number of defined touch areas have been selected, then collates the values associated with the areas touched and encrypts the collated values into a block (for example, as a PIN block or a key). When the XFS HED service provider 44 receives a WFS_CMD_PIN_GET_PINBLOCK command, the hardware encryption device 18 conveys the encrypted block to the transaction application 12 (for a PIN block).

XFS secure mode can also be used for manual entry of PIN keys by an authorized person (such as a bank staff member). When this occurs, the hardware encryption device 18 waits until a correct number of defined touch areas have been selected, then collates the values into a key string, and stores the key string in the secure memory 64 as a new PIN key.

The second type of zone is a mouse area. A mouse area only operates in one mode (referred to as "PC mode" because it emulates a PC screen where a mouse can click on any part of the screen). A touch on any defined area within the mouse area results in a mouse click event being generated and routed through the operating system input queue 26.

Figure 2:
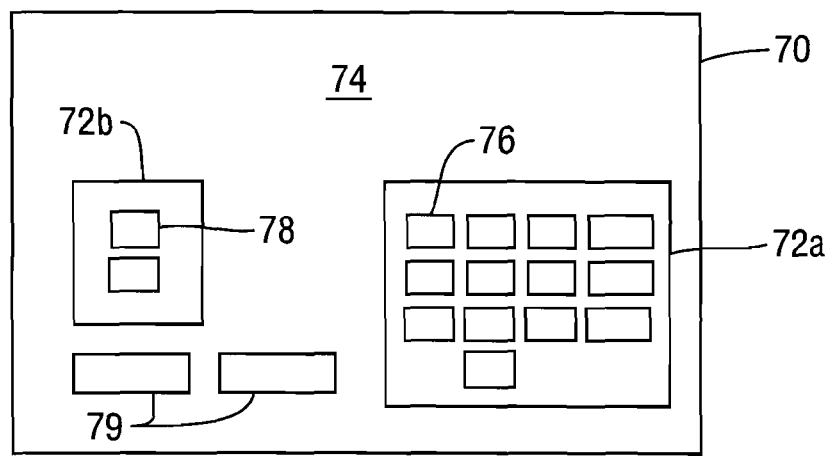
FIG. 2 is a pictorial representation of a first screen layout rendered on the touch-sensitive display of FIG. 1.

FIG. 2 shows a first screen 70 having two pad zones 72a,b. The part of the screen 70 not defined by the two pad zones 72 is a mouse area 74. The first pad zone 72a defines thirteen touch areas 76 (also referred to as buttons); the second pad zone 72b defines two touch areas 78. Two buttons 79 are provided in the mouse area 74.

The transaction application 12 is responsible for defining the size and location of the pad zones 72 and the touch areas 76, 78, and for attributing values to the touch areas 76, 78 (for example, the number "1" to a touch area displaying the number one). The pad zone locations, the touch area locations, the mode of each pad zone, and the values attributed to the touch area locations are referred to collectively as "input configuration information". The mouse buttons 79 are not part of the input configuration information, and the transaction application 12 may not be responsible for defining these mouse buttons 79. Any selection of an area of the screen which is not in a pad zone will be conveyed to the input queue 26 as a mouse click, and thereafter be handled as appropriate by the transaction application 12 (or another application, since it is possible for another application to present a screen behind the ATM screen). It is the function of the transaction application 12 (or another application executing on the operating system) to display buttons in appropriate areas and to process any mouse clicks in those areas or to ignore these mouse clicks.

In this example, the two pad zones 72 operate in XFS open mode.

The transaction application 12 communicates the input configuration information to the XFS HED service provider 44 (via the XFS interface 40 and XFS manager 42). The XFS HED service provider 44 translates this information as necessary and sends it to the hardware encryption device (HED) 18 via the HED driver 50. The cryptographic engine 62 stores the input configuration engine in the secure memory 64 for the duration of time for which the first screen will be displayed.

Figure 3:
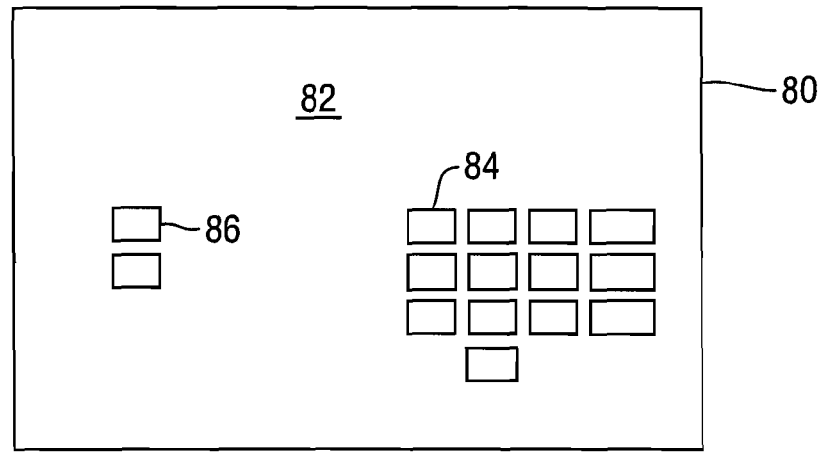
FIG. 3 is a pictorial representation of a second screen layout rendered on the touch-sensitive display of FIG. 1.

FIG. 3 shows a second screen 80 having a single pad zones 82 operating in XFS secure mode. In this embodiment, when a pad zone operates in this mode, no other pad zones are permitted, and no mouse area is permitted on the same screen. Thus, in this embodiment, when a pad zone operates in XFS secure mode, then it necessarily fills the entire screen, as shown in FIG. 3. The pad zone 82 defines a group of thirteen touch areas 84 (also referred to as buttons) and a group of two touch areas 86. This second screen 80 may be used to enable a customer to enter his/her PIN.

Figure 4:
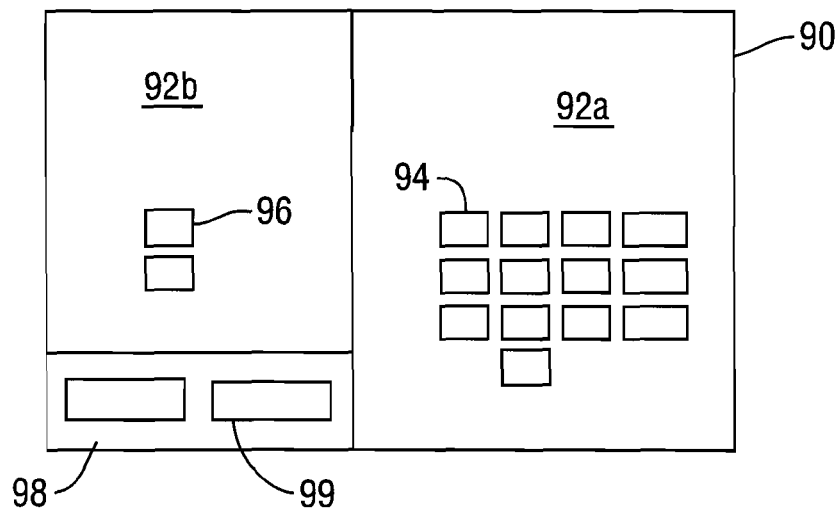
FIG. 4 is a pictorial representation of a third screen layout rendered on the touch-sensitive display of FIG. 1.

FIG. 4 shows a third screen 90 having two pad zones 92a,b and a mouse area 98. The first pad zone 92a defines thirteen touch areas 94; the second pad zone 92b defines two touch areas 96. The first and second pad zones 92 operate in XFS open mode. Two buttons 99 are provided in the mouse area 98. One of the main differences between the configuration of the screens in FIG. 2 and FIG. 4 is that any user touch in mouse area 74 (FIG. 2) will be notified as a mouse click to the input queue 26; in contrast, any user touch in "blank" areas (that is, not the touch areas 94, 96) of pad zones 92 (FIG. 4) will not be notified as a mouse click.

The transaction application 12 conveys input configuration information to the hardware encryption device using an XFS command of the form WFS_CMD_PIN_SET_TOUCH_KEYBOARD. The XFS command specifies, inter alia, the display to be used (if there is more than one display present), the number and location of pad zones, the number and location of touch areas, and the value associated with each touch area.

Operation of Sub-System 10

The operation of the sub-system 10 will now be described with reference to FIG. 5, which is a flowchart 100 illustrating steps implemented by the cryptographic engine 62 to receive and process a customer selection via the touch panel 24.

Initially, the cryptographic engine 62 receives input configuration information from the transaction application 12 (via the service provider suite 14 and the keypad driver suite 16) (step 120). The input configuration information was sent by the transaction application 12 via a WFS_CMD_PIN_SET_TOUCH_KEYBOARD command.

The cryptographic engine 62 ensures that this input configuration information complies with predefined rules (for example, in secure XFS mode, a pad zone must cover the entire screen) (step 122).

If the input configuration information does not comply with the rules, then the cryptographic engine 62 sends an error message back to the transaction application 12 (step 124).

If the input configuration information does comply with the rules, then the cryptographic engine 62 stores this compliant input configuration information in its secure memory 64 (step 126).

Subsequently, the cryptographic engine 62 receives an XFS command relating to a screen being displayed and having features corresponding to the input configuration information (step 128). The type of XFS command received depends on the screen being presented. If the screen being presented requests a customer to input a PIN, then the XFS command will be a WFS_CMD_PIN_GET_PIN command; if the screen being presented requests a customer to input data (such as a transaction option), then the XFS command will be a WFS_CMD_PIN_GET_DATA command.

The cryptographic engine 62 then correlates the XFS command (which includes configuration information) with the stored input configuration information (step 130). Any defined areas in the input configuration information that are not provided in the received XFS command are ignored by the cryptographic engine 62 so that they cannot be selected. Likewise, an XFS command is rejected if it uses defined areas (such as key values) not previously defined in the stored input configuration information.

When the customer views the screen on the display 22, the customer can make a selection by pressing a desired touch area. The co-ordinates touched by the customer are ascertained by the touch panel controller 60 and relayed to the cryptographic engine 62 (step 132).

The cryptographic engine 62 then ascertains if the touched co-ordinate corresponds to a pad zone on the screen (step 134).

If the touched co-ordinate does not correspond to a pad zone on the screen, then the cryptographic engine 62 routes the co-ordinates to the touch panel proxy 28 (step 136). The touch panel proxy 28 receives these co-ordinates and converts them to a format appropriate for the operating system (in this embodiment Windows XP (trade mark)) as a mouse click event, and inputs them into the input queue operating system component 26. The operating system then presents this mouse click to the transaction application 12 (or another application, since it is possible for another application to present a screen behind the ATM screen) in a conventional manner.

If the touched co-ordinate does correspond to a pad zone on the screen, then the cryptographic engine 62 ascertains the value corresponding to the touch area selected by the customer (step 138) using the stored input configuration information.

The cryptographic engine 62 then ascertains if the pad zone is operating in XFS secure mode or XFS open mode (as indicated by the stored input configuration information) (step 140).

If the pad zone is operating in XFS open mode then the cryptographic engine 62 conveys the ascertained value to the transaction application 12 via the service provider suite 14 and the keypad driver suite 16 (step 142). In this embodiment, the ascertained value is transmitted in plain text (cleartext).

Once the ascertained value has been conveyed to the transaction application 12, the cryptographic engine 62 deletes the stored input configuration information from the secure memory 64 in preparation for the next input configuration information associated with the next screen to be rendered on the display 22 (step 144).

If the pad zone is operating in XFS secure mode then the cryptographic engine 62 stores the ascertained value and ascertains if there are any more selections to be made by the customer (step 146) based on the stored input configuration information (which indicates, for example, how many digits are required for a complete PIN entry).

If there are still more selections to be made by the customer, then the cryptographic engine 62 receives these selections and ascertains the corresponding value for each selection (step 148) until all selections have been made by the customer.

Once all of a customer's selections have been received, and the corresponding values ascertained, the cryptographic engine 62 collates these ascertained values in the order they were submitted by the customer (step 150).

The cryptographic engine 62 deletes the stored input configuration information from the secure memory 64 in preparation for the next input configuration information associated with the next screen to be rendered on the display 22 (step 152).

The cryptographic engine 62 then operates on those ascertained values (step 154).

In the event that a customer is entering a PIN, operating on the ascertained values (step 154) involves encrypting those values to form a PIN block, then transmitting the PIN block to the transaction application 12.

In the event that the screen relates to an encrypting key input by an authorized user (such as a member of staff of an organization owning or operating the ATM), then operating on the ascertained values (step 154) involves the cryptographic engine 62 collating the ascertained values and storing them as a new key within the secure memory 64.

Various modifications may be made to the above described embodiment within the scope of the invention, for example, in other embodiments an additional level of encryption may be used within the SST, for example, between the hardware encryption device 18 and a controller executing the transaction application. However, this level of encryption is different from PIN encryption, where a remote host is used to decrypt the encrypted PIN block.

In other embodiments, the encrypting touch-sensitive display sub-system may be incorporated in a self-service terminal other than an ATM, for example, a check-in terminal, or any of the SSTs listed above.

The steps of the methods described herein may be carried out in any suitable order, or simultaneously where appropriate. The methods described herein may be performed by software in machine readable form on a tangible storage medium or as a propagating signal.

The terms "comprising", "including", "incorporating", and "having" are used herein to recite an open-ended list of one or more elements or steps, not a closed list. When such terms are used, those elements or steps recited in the list are not exclusive of other elements or steps that may be added to the list.

APPENDIX 1

The following is a specific example of an XFS command structure that may be used with the above embodiment.

```
Input Param LPWFSPINTOUCHKEYBOARD lpTouchKeyboard;
where
typedef struct _wfs_pin_touchkeyboard
{
    HMONITOR              hMonitor;
    USHORT                usNumberOfPadZones;
    USHORT                usNumberOfTouchAreas;
    LPWFSPINPADZONE       *lppPadZones;
    LPWFSPINTOUCHAREA     *lppTouchAreas;
} WFSPINTOUCHKEYBOARD, *LPWFSPINTOUCHKEYBOARD;
``` hMonitor

The handle of the Windows (trade mark) monitor being used. A value of NULL indicates the Windows primary monitor.

usNumberOfPadZones

Specifies the number Pad Zones held in the buffer whose address is lpPadZones. This is limited to a maximum value of 10. A value of zero indicates that the entire touch screen reverts to PC mode.

usNumberOfTouchAreas

Specifies the number Touch Areas held in the buffer whose address is lpTouchAreas. This is limited to a maximum value of 64 in this example.

lppPadZones

The address of an array of addresses of WFSPINPADZONES structures.

lppTouchAreas

The address of an array of addresses of WFSPINTOUCHAREA structures defining details of the keys in the keyboard. See below.

Pad Zone Definition

```
typedef struct _wfs_pin_padzone
{
    LONG    lLeft;
    LONG    lTop;
    LONG    lRight;
    LONG    lBottom;
} WFSPINPADZONE, *LPWFSPINPADZONE;
``` lLeft

Specifies the left coordinate of the pad zone in Windows virtual coordinates within the specified Windows monitor. This value can be negative.

lTop

Specifies the top coordinate of the pad zone in Windows virtual coordinates within the specified Windows monitor. This value can be negative.

lRight

Specifies the right coordinate of the pad zone in Windows virtual coordinates within the specified Windows monitor. This value can be negative.

lBottom

Specifies the bottom coordinate of the pad zone in Windows virtual coordinates within the specified Windows monitor. This value can be negative.

Touch Area Definition

```
typedef struct _wfs_pin_toucharea
{
    LONG    lLeft;
    LONG    lTop;
    LONG    lRight;
```

-continued

```
        LONG    lBottom;
        USHORT  usKeyType;
        ULONG   ulKey;
} WFSPINTOUCHAREA, *LPWFSPINTOUCHAREA;
``` lLeft

Specifies the left coordinate of the touch area in Windows virtual coordinates within the specified Windows monitor. This value can be negative.

lTop

Specifies the top coordinate of the touch area in Windows virtual coordinates within the specified Windows monitor. This value can be negative.

lRight

Specifies the right coordinate of the touch area in Windows virtual coordinates within the specified Windows monitor. This value can be negative.

lBottom

Specifies the bottom coordinate of the touch area in Windows virtual coordinates within the specified Windows monitor. This value can be negative.

ulKeyType

WFS_PIN_FK or WFS_PIN_FDK. Defines the type of XFS key definition value held in ulKey.

ulKey

Specifies the XFS key code for this area. This must be one of the function keys.

WFS_PIN_FK__0 (numeric digit 0)
WFS_PIN_FK__1 (numeric digit 1)
WFS_PIN_FK__2 (numeric digit 2)
WFS_PIN_FK__3 (numeric digit 3)
WFS_PIN_FK__4 (numeric digit 4)
WFS_PIN_FK__5 (numeric digit 5)
WFS_PIN_FK__6 (numeric digit 6)
WFS_PIN_FK__7 (numeric digit 7)
WFS_PIN_FK__8 (numeric digit 8)
WFS_PIN_FK__9 (numeric digit 9)
WFS_PIN_FK_ENTER
WFS_PIN_FK_CANCEL
WFS_PIN_FK_CLEAR
WFS_PIN_FK_BACKSPACE
WFS_PIN_FK_HELP
WFS_PIN_FK_DECPOINT
WFS_PIN_FK__00
WFS_PIN_FK__000

The remaining 6 bit masks may be used as vendor dependent keys.

WFS_PIN_FK_OEM1
WFS_PIN_FK_OEM2
WFS_PIN_FK_OEM3
WFS_PIN_FK_OEM4
WFS_PIN_FK_OEM5
WFS_PIN_FK_OEM6
WFS_PIN_FK_UNUSED
WFS_PIN_FK_A
WFS_PIN_FK_B
WFS_PIN_FK_C
WFS_PIN_FK_D
WFS_PIN_FK_E
WFS_PIN_FK_F
WFS_PIN_FK_SHIFT
WFS_PIN_FK_FDK01 to WFS_PIN_FK_FDK32

Output Param: None.

Error Codes Only the generic error codes can be generated by this command.

WFS_ERR_INVALID_DATA is returned if

Any coordinates for Pad Zones and Touch Areas are not on the specified Windows monitor (for example, because they are bigger than the screen)

Any Pad Zones overlap

Any Touch Areas overlap

Any touch areas are not within a single Pad Zone

There are more than 10 Pad Zones

There are more than 64 Touch Areas

A numeric key code has been specified on more than one Touch Area

WFS_ERR_SEQUENCE_ERROR is returned if

There is already a WFS_CMD_PIN_GET_PIN, WFS_C-MS_PIN_GET_DATA or WFS_CMD_PIN_SECUREKEY_ENTRY in progress or queued for execution.

Events: None

APPENDIX 2

The following is a specific example of the XFS command structure described in Appendix 1 applied to the following screen.

The display is the Windows Primary Monitor, so (0,0) is at the top left of the screen. The keyboard is to be used for data entry with cancel, enter, and clear keys. There is a XFS "help" key and an XFS FDK (function defined key) used. PC mode is required in the top left quarter of the screen. The screen resolution is 800 by 600. The screen is divided into quarters. The top right quarter is used for user instructions and an echo area. The bottom right corner is used for a 13 key pin pad in touchtone format. The bottom left corner is used for "help" and an FDK. The easiest definition of the required keyboard is one Pad Zone and 15 Touch areas. Note that numeric keys act as XFS Secure keys and are not echoed in any event during PIN entry.

```
WFSPINPADZONE PadZoneData [2] = { // left, top, right, bottom
                            // top right quarter
                                 {400, 0, 799, 299},
                            // bottom half
                                 {400,300,799, 599}
                            };
WFSPINPADZONE PadZones [2] = { &PadZoneData[0],
 &PadZoneData[1] };
WFSPINTOUCHAREA TouchAreasData [15] =
  { // left, top, right, bottom, key type, value
    // top row
    {510, 390, 550, 420, WFS_PIN_FK, WFS_PIN_FK__1},  // 1
    {580, 390, 620, 420, WFS_PIN_FK, WFS_PIN_FK__2},  // 2
    {650, 390, 690, 420, WFS_PIN_FK, WFS_PIN_FK__3},  // 3
    {720, 390, 760, 420, WFS_PIN_FK, WFS_PIN_FK_CLEAR},
    // clear
    // 2nd row
    {510, 440, 550, 470, WFS_PIN_FK, WFS_PIN_FK__4},  // 4
    {580, 440, 620, 470, WFS_PIN_FK, WFS_PIN_FK__5},  // 5
    {650, 440, 690, 470, WFS_PIN_FK, WFS_PIN_FK__6},  // 6
    {720, 440, 760, 470, WFS_PIN_FK, WFS_PIN_FK_CANCEL},
    // cancel
    // 3rd row
    {510, 490, 550, 510, WFS_PIN_FK, WFS_PIN_FK__7},  // 7
    {580, 490, 620, 510, WFS_PIN_FK, WFS_PIN_FK__8},  // 8
    {650, 490, 690, 510, WFS_PIN_FK, WFS_PIN_FK__9},  // 9
    {720, 490, 760, 510, WFS_PIN_FK, WFS_PIN_FK_ENTER},
    // enter
    // 4th row
    {580, 530, 620, 560, WFS_PIN_FK, WFS_PIN_FK__0},  // 0
    // bottom left function key
    {050, 390, 080, 420, WFS_PIN_FK, WFS_PIN_FK_HELP},
    // help
    // bottom left FDK
```

-continued

```
   {050, 530, 080, 560, WFS_PIN_FDK, WFS_PIN_FDK01}
   // FDK 01
   }};
WFSPINTOUCHAREA* TouchAreas [15];
WFSPINTOUCHKEYBOARD TouchKeyboard =
{
   NULL,      // Windows primary monitor
   1,         // number of Pad Zones
   PadZones,
   15         // number of Touch Areas
      TouchAreas };
HRESULT hResult;
for (int 1=0 ; i<15; i++)
{
   TouchArea[i] = &TouchAreasData[i];
}
hResult = WFSAsyncExecute ( hService,
         WFS_CMD_PIN_SET_TOUCH_KEYBOARD,
         &TouchKeyboard,
         WFS_INDEFINITE_WAIT,
         hWnd,
         &RequestId);
WFSPINGETDATA Details;
Details.usMaxLen = 4;
Details.bAutoEnd = TRUE;
Details.ulActiveFDKs = WFS_PIN_FDK01;
Details.ulActiveKeys = WFS_PIN_FK_0
         | WFS_PIN_FK_1
         | WFS_PIN_FK_2
         | WFS_PIN_FK_3
         | WFS_PIN_FK_4
         | WFS_PIN_FK_5
         | WFS_PIN_FK_6
         | WFS_PIN_FK_7
         | WFS_PIN_FK_8
         | WFS_PIN_FK_9
         | WFS_PIN_FK_HELP
         | WFS_PIN_FK_CLEAR
         | WFS_PIN_FK_CANCEL
         | WFS_PIN_FK_ENTER;
Details.ulTerminateFDKs = 0;
Details.ulTerminateKeys = WFS_PIN_FK_CANCEL;
hResult = WFSAsyncExecute ( hService,
         WFS_CMD_PIN_GET_DATA,
         &PinDetails,
         WFS_INDEFINITE_WAIT,
         hWnd,
         &RequestId);
```

What is claimed is:

1. A method of controlling an encrypting touch-sensitive display, the method comprising:
creating a pad zone on a screen to be rendered on the touch-sensitive display;
creating touch areas within the pad zone, each touch area having a value;
assigning an operating mode to the touch areas within the pad zone, where the operating mode is either: (i) secure, for which the value associated with each touch area is not returned to an application on selection of that touch area; or (ii) open, for which the value associated with each touch area is returned to an application through a touch area input queue on selection of that touch area;
providing an option to create a mouse area outside the pad zone on the screen to be rendered on the touch-sensitive display, but only where the operating mode of the touch areas within the pad zone is the open mode; and
enabling a touch selection within the mouse area to be transferred to an operating system input queue instead of the touch area input queue.

2. A method according to claim 1, wherein the step of creating a pad zone on a screen to be rendered on the touch-sensitive display is implemented by conveying co-ordinates of the pad zone from an application to an engine located within a hardware encryption device.

3. A method according to claim 1, wherein the step of creating a pad zone on a screen may be implemented on each occasion that a customer input via a keypad or keyboard is required.

4. A method according to claim 1, wherein the step of creating a pad zone on a screen and creating touch areas within the pad zone may be implemented simultaneously using a CEN XFS format command.

5. An encrypting touch-sensitive display system comprising:
a display for rendering a screen created by an application;
a transparent, touch-sensitive panel in registration with the display and mounted thereto;
a touch-sensitive panel controller in communication with the touch-sensitive panel and operable to receive co-ordinates therefrom, the received coordinates corresponding to an area of the touch-sensitive panel touched by a customer;
a cryptographic engine in communication with the touch-sensitive panel controller and operable to discriminate between selection of a touch area within a pad zone in open mode and in secure mode; and
a tamper-responsive mechanism sealingly enclosing the display, touch-sensitive panel, touch-sensitive panel controller, and cryptographic engine, to (i) detect disassembly or tampering of the coupled components, and (ii) reset the cryptographic engine in response thereto including a micro-switch to detect disassembly of the system and a membrane to detect penetration of a component within the system.

6. An encrypting touch-sensitive display system according to claim 5, further comprising a driver suite for requesting the hardware encryption device to perform functions and route responses to a requesting application.

7. An encrypting touch-sensitive display system according to claim 6, further comprising a keypad service provider for receiving standard commands and translating these commands for the driver suite to implement.

8. An encrypting touch-sensitive display control system according to claim 7, wherein the system further comprises a touch panel proxy for routing mouse click events from either the hardware encryption device or the driver suite to an operating system input queue.

* * * * *